June 8, 1948. J. N. APGAR 2,442,914
TRAILER COUPLER
Filed June 3, 1946 3 Sheets-Sheet 1

Inventor:
John N. Apgar,
by Pierce & Scheffler,
Attorneys.

June 8, 1948.  J. N. APGAR  2,442,914
TRAILER COUPLER
Filed June 3, 1946  3 Sheets-Sheet 2
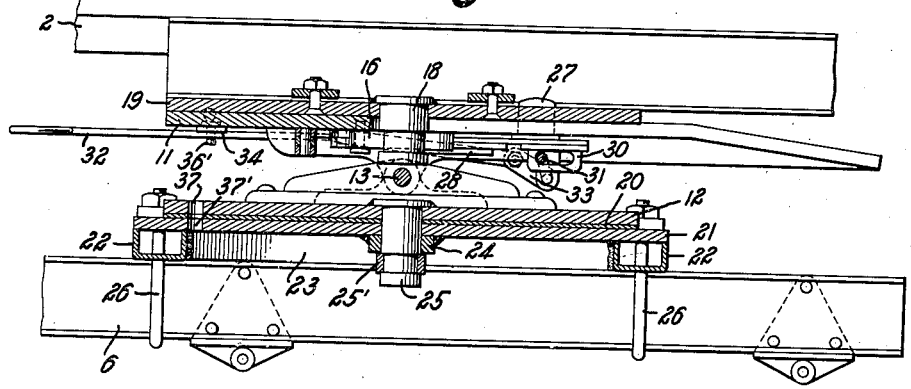
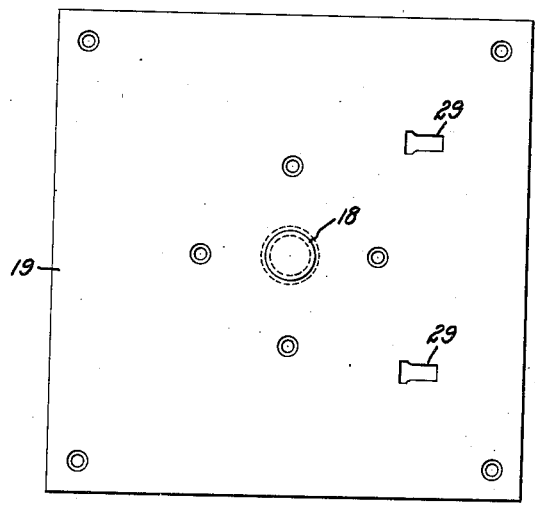
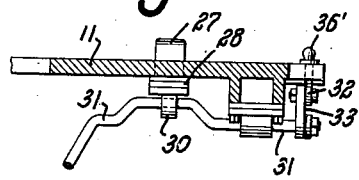
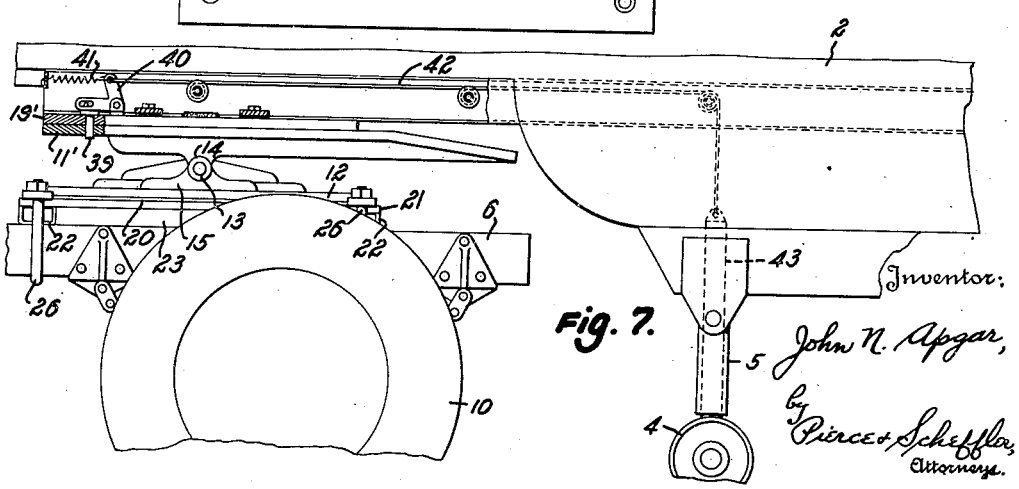
Inventor:
John N. Apgar,
by Pierce & Scheffler,
Attorneys.

June 8, 1948. J. N. APGAR 2,442,914
TRAILER COUPLER
Filed June 3, 1946 3 Sheets-Sheet 3

Inventor:
John N. Apgar,
By Pierce & Scheffler,
Attorneys.

Patented June 8, 1948

2,442,914

UNITED STATES PATENT OFFICE 2,442,914

TRAILER COUPLER

John N. Apgar, Bound Brook, N. J.

Application June 3, 1946, Serial No. 673,974

14 Claims. (Cl. 280—33.05)

1

This invention relates to trailer couplers or fifth wheel constructions such as employed in trucking equipment for connecting trailers and semi-trailers to tractor units.

This application is a continuation-in-part of, and substitute for, my copending application Serial Number 547,148, filed July 29, 1944, now abandoned.

The fifth wheel couplings and auxiliary gear now in general use vary somewhat as to details but they are basically so similar in construction and operation as to comprise a type that will be referred to herein as the conventional fifth wheel coupling of present trucking practice. The main bearing portion of this conventional coupling comprises a plate, which may be a steel casting, that is supported on the tractor unit for rocking movement about an axis parallel to and above or somewhat in front of the rear axle of the tractor unit. This rocking mounting is provided by a shaft, or axially alined shafts, that extend transversely across the tractor unit and are mounted in trunnions secured respectively to said bearing plate and to the tractor frame. The forward half of the bearing plate is semi-circular, in plan view, and the rear half is forked to provide a guide for the introduction of the king pin carried by a flat plate rigidly fastened to the underside of the forward end of the trailer body. A latch or clutch mechanism is attached to the underside of the mounting plate to close upon the king pin as it reaches the end of the guide slot to complete the coupling of the tractor-trailer combination. The two plates and the king pin form the fifth wheel connection that permits the tractor and trailer to assume different angular relations during travel along winding roads, and in turning corners or parking. Independent movement of the tractor and trailer to follow ups and downs of the road is provided by the rocking mounting of the bearing plate of the tractor.

This type of fifth wheel coupling has not been entirely satisfactory in spite of its almost universal use in the trucking industry. The rocking mounting of the tractor bearing plate affords a stable support for the semi-trailer when the tractor and trailer are alined longitudinally, since the axis of rocking movement is then parallel to the single axle at the rear of the semi-trailer, but the resistance to tilting decreases progressively as the tractor unit moves out of longitudinal alinement with the trailer. In turning sharp corners or in parking maneuvers, the resistance to tilting or upset of the trailer falls to that of a three point support as the tractor

2 moves to an angle of 90° with respect to the trailer.

Some of the previously proposed trailer couplings afford greater stability against trailer sway and upset but tractor and trailer units equipped with these previously proposed couplings could not be used interchangeably with units having the conventional couplings. The new trailer couplings of this invention permit use of any tractor unit, of the conventional or of the new design, with any trailer unit of either conventional or of new design.

Objects of the present invention are to provide new tractor-trailer combinations, or new fifth wheel couplings for tractor-trailer combinations, that afford increased stability for the trailer without imposing any limitations upon the use of the new tractor or new trailer units with trailer or tractor units, respectively, of the present design. An object of the invention is to provide tractor-trailer combinations and fifth wheel couplings for the same in which a substantially four point support for the trailer unit is not materially affected by variations in the angular position of the tractor unit with respect to the trailer unit. More specifically, objects of the invention are to provide tractor-trailer combinations and fifth wheel constructions for the same which differ from conventional practice in that the bearing plate of the tractor unit is mounted on a turntable and the cooperating plate of the trailer unit can be latched to the tractor bearing plate to retain the rocking axis of the tractor bearing plate parallel to the axle at the rear of the trailer unit. Other objects are to provide turntable assemblies for the conversion of conventional fifth wheel couplings into mechanically stable tractor-trailer couplings. Further objects are to provide tractor-trailer assemblies, and coupling systems for tractor-trailer assemblies, in which increased stability in operation is obtained by displacing the point of application of the trailer weight laterally of the tractor when rounding a curve, the direction of the displacement being towards the inside of the curve.

These and other objects and advantages of the invention will be apparent from the following specification when taken with the accompanying drawings in which:

Fig. 4 is a central section as taken on the plane of line 4—4 of Fig. 2;

Fig. 5 is a plan view of the plate secured to the trailer unit;

Fig. 6 is a detail fragmentary view, in section, showing the mechanism for actuating the latches for connecting the bearing plates to each other;

Fig. 7 is a fragmentary side elevation illustrating another embodiment of the invention;

Figure 1:
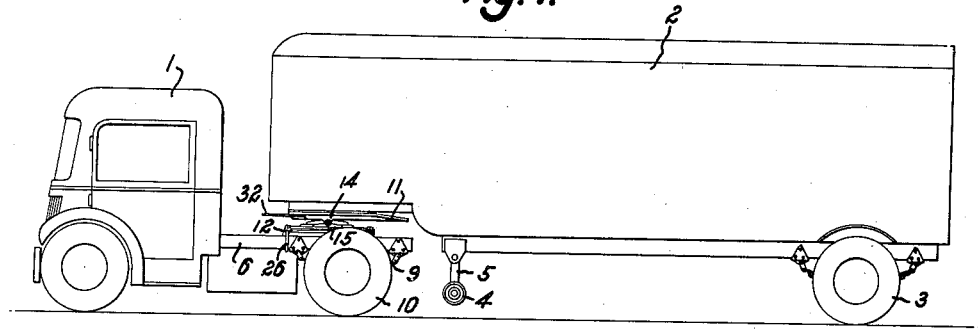
Fig. 1 is a side elevation of a tractor-trailer combination embodying the invention.
Figure 2:
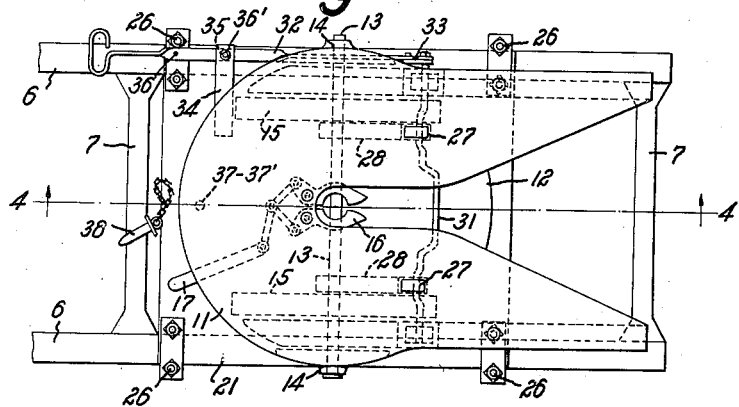
Fig. 2 is a fragmentary plan view of the coupling elements mounted on the tractor unit.
Figure 3:
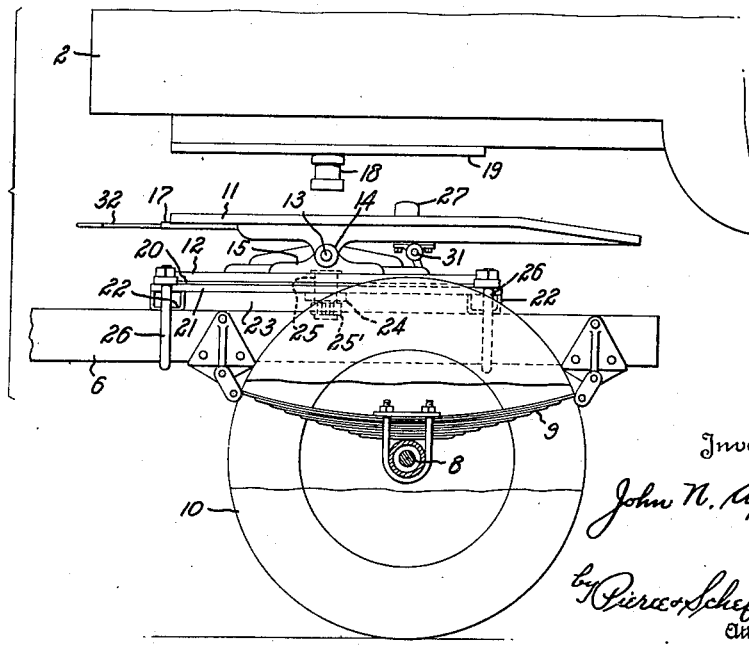
Fig. 3 is an exploded view, on a larger scale, of the fifth wheel construction.

In the drawings, the reference numeral 1 identifies a tractor unit of a short wheel base type to which a trailer unit 2 is releasably connected by a fifth wheel coupling. The rear end of the trailer is spring-supported on wheels 3 in the usual manner, and the front end is provided with some form of landing gear, such as wheels 4 on telescoping legs 5, for supporting the trailer body when separated from the tractor unit 1. The frame of the tractor, comprising side channels 6 and cross braces 7, is supported on the rear axle 8 by the springs 9, and the axle is supported in turn by the wheels 10.

The elements of the trailer couplings on the tractor unit include a main bearing plate 11 of the usual forked or yoke shape that is connected to a base or platform 12 by rubber mounted bearing pins 13 and trunnions 14, 15 on the plate 11 and base 12, respectively. An automatic or semi-automatic clutch 16, together with its release handle 17, is mounted on the lower face of the plate 11 to engage the coupling pin 18 and latch the upper bearing plate 19 to the main bearing plate 11. The pin 18 is welded to the plate 19, and the latter is rigidly fixed to the trailer 2 in conventional manner.

The elements so far described will be recognized as identical with or at least the structural equivalents of corresponding parts of the fifth wheel couplings now in general use in the trucking industry. The trunnions 15 of the conventional couplings have usually been secured directly to the frame of the tractor and, when a base or platform 12 has been used, it took the form of a casting or rough plate that was rigidly fixed to the tractor frame. In accordance with this invention, the platform 12 is the top plate of a turntable which constitutes the true fifth wheel of the trailer coupling. The turntable base comprises a thin steel bearing plate 20, usually of circular form, welded to a heavy supporting plate 21 which, in turn, is welded to a framework of cross channels 22 and longitudinal channels 23. A thick plate or bushing 24 is welded to the lower face of the plate 21 to increase the length of the bearing provided for the turntable pin 25 that is welded to the upper plate or table 12. The lower end of the pin 25 is circumferentially grooved to receive the clamp ring 25' which retains the turntable in assembled condition. The turntable base is rigidly secured to the tractor frame by U-bolts 26 that pass through openings in the frame channels 22 and the supporting plate 21.

Keys or latches 27 are mounted on the ends of leaf springs 28 secured to the lower face of the bearing plate 11, the keys 27 extending through openings in the plate to enter tapered slots 29 in the bearing plate 19 that is fixed to the trailer. Yokes 30 are welded to the ends of the springs 28 and a bent rod or crankshaft 31 extends through the yokes and is journalled on the plate 11 to serve as a release member for the keys 27. A link 32 is pivotally connected to the arm 33 that is secured to the release shaft 31, the outer end of the link being slidably supported in a bracket 34 that is welded to the plate 11. The link has a pair of spaced holes 35 that aline with a hole 36 in the bracket when the link is in its end position corresponding to an adjustment of the keys 27 to projected or, alternatively, to retracted position. Actual practice has proved that the spring mounting of the keys 27 is sufficient to retain them in projected positions under normal driving and parking conditions but it is preferable to supplement the spring action by a mechanical lock when the coupling is not apt to be released or to come under observation for long periods of time for any reason, or when unusually rough driving conditions are to be encountered. This mechanical lock is supplied by inserting a pin or bolt 36' in the alined holes 35, 36 of the operating link 32 and the bracket 34.

It will be apparent that the latching of the bearing plates 11, 19 to each other by the keys 27 results in a mounting of the bearing pins 13 in fixed position with respect to the trailer, i. e. with the axis of the pins 13 parallel to the axle of the wheels 10 of the trailer. The turntable structure provides the fifth wheel coupling which permits relative angular movement of the tractor and trailer units, and the lateral or sway stability of the trailer is not affected by the turning of the tractor with respect to the trailer. The tractor and trailer are coupled in the usual manner by backing the tractor to carry the forked plate 11 under the plate 19 of the trailer, and the units are separated in conventional manner after actuating the clutch release lever 17 and the key release link 32.

Existing trailers with bearing plates not provided with key-receiving slots may of course be coupled to tractors having fifth wheel couplings as herein described as the trailer plate will merely ride upon and depress the keys 27, or the keys may be depressed and locked down by the release link 32. The turntable must be locked against operation with such a new tractor-conventional trailer combination, and this condition is readily attained by providing the plate 12 and plates 20, 21 with openings 37, 37' respectively in which a pin 33 may be inserted to lock the turntable with the axis of the rocking pins 13 parallel to the wheel axles of the tractor unit. Trailers with coupling mechanism of the new type may be operated by tractors with the conventional fifth wheel couplings as the slots 29 in the trailer bearing plates 19 will not interfere in any way with angular movement of the contacting bearing plates about the axis of the coupling pin 18.

The mechanical locking of the tractor and trailer bearing plates respectively may be effected by mechanism correlated to the landing gear of the trailer unit. As illustrated in Fig. 7, a latch key or pin 39 on the trailer unit is carried by a bell-crank lever 40 that is urged in counterclockwise direction by a spring 41 to project the pin through openings in the plates 11', 19' and is rocked clockwise to prevent this coupling by a flexible connection 42 to a reciprocating element 43 of the telescoping leg 5 of the trailer landing gear. The coupling devices on the tractor are of the turntable supported type, as previously described, and the tractor and trailer units are connected in the conventional manner by backing the tractor to carry the forked plate 11' beneath the trailer bearing plate 19'. The landing gear is then retracted and the lifting of the member 43 slacks off the flexible connection 42 to permit angular movement of lever 40 by the spring 41 to carry the latch pin 39 into the openings of the bearing plates.

As with the embodiment of the invention illustrated in Figs. 1 to 6, the tractor and trailer units with coupling devices of the Fig. 7 type can be used interchangeably with tractor and trailer units having fifth wheel couplings of conventional type.

Figure 8:
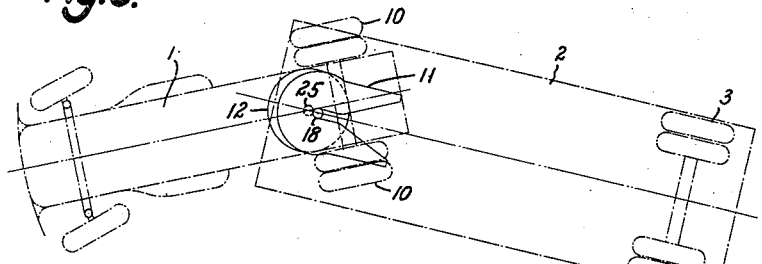
Fig. 8 is a schematic plan view of another coupling assembly embodying the invention, the tractor and trailer being shown in broken line in position rounding a curve.
Figure 9:
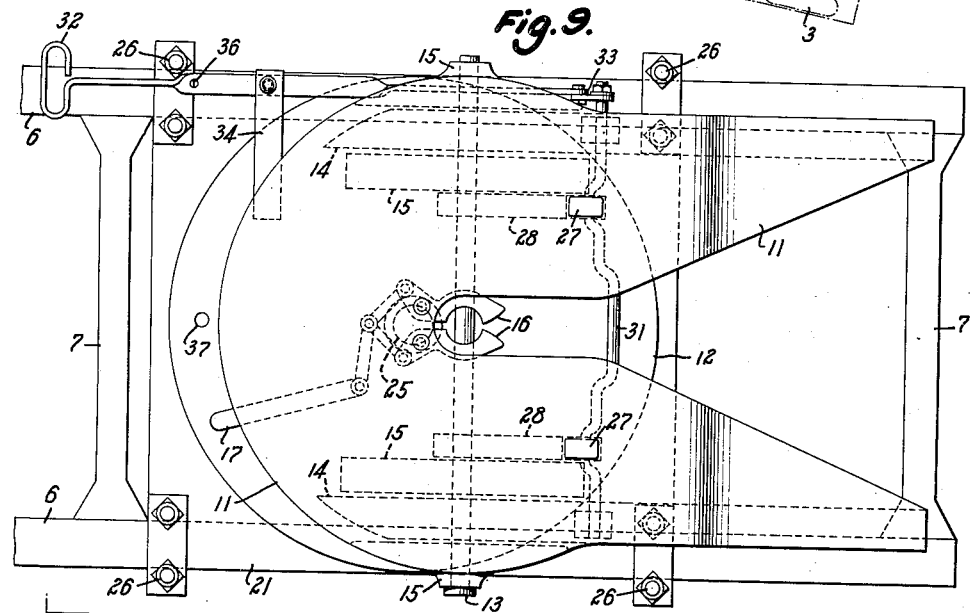
Fig. 9 is a fragmentary plan view of the tractor section of the coupling unit.
Figure 10:
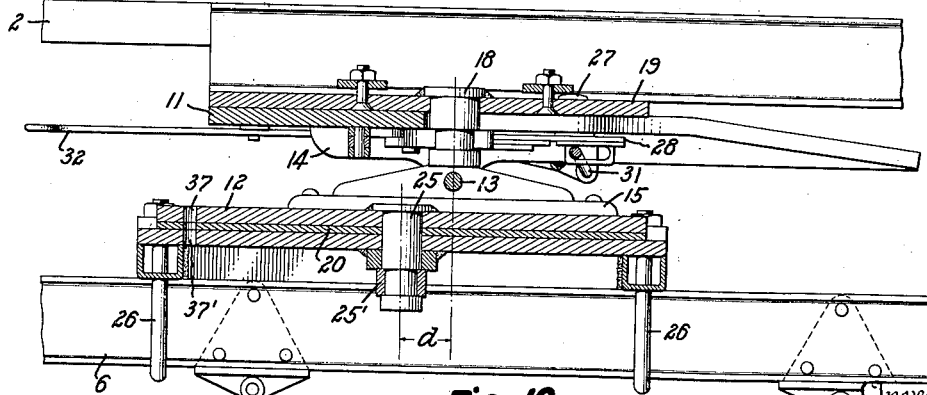
Fig. 10 is a central vertical section through the coupling unit and adjacent parts of the tractor and trailer.

A marked increase in stability is obtained by shifting the point of application of the trailer weight to the rear of the turntable axis. Assuming a uniform distribution of the load in the trailer, about one-half of the trailer weight load is transmitted to the turntable through the shaft 13 and trunnions 14, 15, and the resultant of these forces or weights acts vertically through the mid-point between the trunnions 14, 15 and, in the conventional fifth wheel constructions such as here illustrated, the axis of the fifth wheel king pin 18 passes through this mid-point. In the preferred embodiment of the invention which is illustrated in Figs. 8, 9 and 10, the shaft 13 and the king pin 18 are located rearwardly of the turntable king pin 25 by a short distance, and the point of application of the trailer weight thereby moves laterally of the trailer, see Fig. 8, when the tractor-trailer assembly enters a curve. This lateral displacement of the trailer weight is towards the inside of the curve whether the turn is towards the left, as illustrated, or towards the right, i. e. in the proper sense to oppose the centrifugal forces which tend to increase the portion of the trailer load that is carried by the outside rear wheels 10 of the tractor.

The detailed construction of the coupling may conform to that of either of the previously described embodiments except, of course, for rearward displacement of the axis of the shaft 13 (and of the fifth wheel king pin 18 which is vertically alined therewith) from the turntable king pin 25 by a short distance d, see Fig. 10. Except for this change, the coupling illustrated in Figs. 9 and 10 is substantially identical with that shown in Figs. 1 to 6 inclusive, and the several parts have been identified by the same reference numerals but will not be described in detail.

The full advantages of the invention are obtained only when both the tractor and the trailer units have the novel types of cooperating coupling members but the adaptability of tractor and trailer units with new coupling devices for use with units having conventional coupling devices is an important feature of the invention.

It is to be understood that the invention is not limited to the particular constructions herein illustrated and described as various modifications that may occur to those familiar with the design of trucking equipment fall within the scope of my invention as set forth in the following claims.

I claim:

1. A mounting for the tractor section of a fifth wheel assembly, said mounting comprising a base to be secured to a tractor, a lower turntable plate rigidly secured to said base, an upper turntable plate to which said tractor section of the fifth wheel assembly may be secured, a turntable pin welded to said upper turntable plate and pivotally connecting said plates for angular movement, said lower turntable plate comprising a thin steel plate and a supporting plate therefor welded to said base, and a bushing welded to said supporting plate to increase the length of the bearing for said turntable pin.

2. A mounting for the tractor section of a fifth wheel assembly, said mounting comprising a base to be secured to a tractor, a lower turntable plate rigidly secured to said base, an upper turntable plate to which said tractor section of the fifth wheel assembly may be secured, a turntable pin welded to said upper turntable plate and pivotally connecting said plates for angular movement and a bushing welded to said supporting plate to increase the length of the bearing for said turntable pin.

3. A conversion unit for use with a conventional fifth wheel coupling of the type including an upper bearing plate and coupling pin rigidly secured to a trailer, a lower bearing plate of yoke shape for receiving the coupling pin, and bearing means rigidly secured to a tractor supporting said lower bearing plate for rocking movement about a horizontal axis transverse to the axis of the tractor; said conversion unit adapting said lower bearing plate for rocking movement about an axis transverse to the trailer; and comprising a lower turntable plate to be rigidly secured to the tractor, an upper turntable plate upon which the bearing means of the conventional fifth wheel is to be secured, means coupling said turntable plates for angular movement, whereby said bearing plates of the conventional fifth wheel coupling may be provided with means latching said bearing plates to each other with the axis of said bearing means transverse to the trailer; and means for locking said turntable plates to each other with the axis of the bearing means transverse to the tractor, whereby a tractor provided with a conversion unit may be employed with a trailer not equipped with means for locking the bearing plates to each other.

4. A conversion unit as recited in claim 3, wherein said latching means includes a key, and spring means securing said key to said lower bearing plate and normally projecting the key above the upper surface thereof to enter an opening in the upper bearing plate.

5. A conversion unit as recited in claim 3, wherein said turntable plates are pivotally interconnected by a pin secured to and depending from said upper turntable plate, and a bushing for said pin is secured to and depends from said lower turntable plate.

6. In a fifth wheel trailer coupling for a tractor-trailer assembly, a bearing plate and coupling pin adapted to be rigidly secured to a trailer, a cooperating lower bearing plate having a slot therein for receiving said coupling pin, means supporting said lower bearing plate for rocking movement about a horizontal axis, means to be secured to a tractor unit for mounting said supporting means for angular movement about a vertical axis on the longitudinal center line of the tractor and in front of said horizontal axis of rocking movement, and means for latching said bearing plates to each other with the axis of rocking movement extending transversely of the longitudinal center line of the trailer.

7. In a trailer coupling for a tractor-trailer assembly, a turntable to be rigidly mounted on a tractor, said turntable including a lower fixed plate and an upper plate secured to said lower plate for angular movement about a vertical axis, and means mounted on the upper bearing plate for connection to a trailer to support the same for rocking movement about a horizontal axis extending transversely of the longitudinal axis of the trailer and located to the rear of the vertical axis of said turntable.

8. In a trailer coupling for a tractor-trailer assembly, a turntable to be rigidly mounted on a tractor, said turntable including a lower fixed plate and an upper plate secured to said lower plate for angular movement about a vertical axis, trunnions mounted on said upper plate for supporting horizontal shaft means with the axis thereof transverse to a trailer and located rearwardly of said vertical axis, shaft means supported by said trunnions, and means supported by said shaft means and adapted to be rigidly secured to a trailer.

9. A trailer coupling for a tractor-trailer assembly, said coupling comprising a turntable to be mounted upon a tractor, said turntable including a lower plate to be rigidly mounted on the tractor, and an upper plate supported for angular movement about a vertical axis with respect to said lower plate, and means on said upper plate for connection to a trailer to transmit the trailer weight to said upper plate at a point rearwardly of the said vertical axis of the turntable.

10. A trailer coupling as recited in claim 9, wherein said means mounted on the upper plate includes means supporting said trailer for rocking movement about an axis transverse to the longitudinal center line of the trailer.

11. In a tractor-trailer assembly, a tractor, a trailer, a turntable mounted on said tractor and including upper and lower plates connected for relative angular movement, a bearing plate mounted on said upper turntable plate for rocking movement, a cooperating bearing plate secured to said trailer, a landing gear on said trailer, and locking means controlled by said landing gear for locking said bearing plates against relative angular and longitudinal movements.

12. In a fifth wheel coupling for a tractor-trailer assembly, a turntable to be mounted on a tractor and comprising upper and lower plates connected for relatively angular motion about a vertical axis, and a rocking support for a trailer secured to said upper plate, the said support having a rocking axis positioned rearwardly of the axis of said turntable.

13. In a tractor-trailer coupling, a turntable to be mounted on a tractor, and a fifth wheel assembly secured to the upper plate of said turntable, said fifth wheel assembly including cooperating bearing plates to be secured respectively to said turntable and to said trailer, means supporting one of said bearing plates on the upper turntable plate for rocking movement about an axis transverse to the longitudinal axis of the trailer, a landing gear for said trailer, and locking means controlled by said landing gear upon movement thereof into retracted position to secure said bearing plates against separation and against relative angular movement.

14. In a tractor-trailer assembly, the invention as recited in claim 13, wherein said locking means includes a pin carried by one of said bearing plates for insertion in an opening in the other bearing plate, spring means tending to project said pin into the opening of said other bearing plate, and means actuated by said landing gear when extended into operative position to withdraw said pin from its cooperating opening.

JOHN N. APGAR.

REFERENCES CITED

The following references are of record in the file of this patent:

UNITED STATES PATENTS

| Number | Name | Date |
|---|---|---|
| 2,130,004 | Fusetti et al. | Sept. 13, 1938 |
| 2,201,353 | Soulis | May 21, 1940 |
| 2,213,424 | Winn | Sept. 3, 1940 |